US011153336B2

(12) United States Patent
Beatty et al.

(10) Patent No.: US 11,153,336 B2
(45) Date of Patent: *Oct. 19, 2021

(54) NETWORK SECURITY ANALYSIS FOR SMART APPLIANCES

(71) Applicant: Cujo LLC, El Segundo, CA (US)

(72) Inventors: Robert Beatty, Lauderhill, FL (US); Yuri Frayman, Miami, FL (US); Einaras von Gravrock, Redondo Beach, CA (US)

(73) Assignee: Cujo LLC, Walnut, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/796,596

(22) Filed: Feb. 20, 2020

(65) Prior Publication Data

US 2020/0195666 A1 Jun. 18, 2020

Related U.S. Application Data

(63) Continuation of application No. 16/246,526, filed on Jan. 13, 2019, now Pat. No. 10,609,051, which is a
(Continued)

(51) Int. Cl.
*H04L 29/06* (2006.01)
*H04L 29/08* (2006.01)

(52) U.S. Cl.
CPC ...... *H04L 63/1416* (2013.01); *H04L 63/1425* (2013.01); *H04L 63/1441* (2013.01); *H04L 67/10* (2013.01); *H04L 67/12* (2013.01)

(58) Field of Classification Search
CPC ..... H04L 63/1416; H04L 67/10; H04L 67/12; H04L 63/1425; H04L 63/1441
(Continued)

(56) References Cited

U.S. PATENT DOCUMENTS 7,292,531 B1 * 11/2007 Hill ...................... H04L 41/0896
370/230.1
7,716,369 B2 * 5/2010 Le Pennec ........ H04L 29/12509
709/245
(Continued)

FOREIGN PATENT DOCUMENTS

WO 9704318 A1 2/1997
WO WO-9704318 A1 * 2/1997 .............. G01P 1/026

OTHER PUBLICATIONS

Ungerleider, N., "Even Barbie Can Be Hacked," 2 Minute Read | Fast Feed, Fast Company & Inc., Nov. 30, 2015, 2 pages, [Online] [Retrieved on Nov. 1, 2016], Retrieved from the Internet<URL:http://www.fastcompany.com/3054051/fast-feed/even-barbie-can-be-hacked>.

(Continued)

*Primary Examiner* — Badri Narayanan Champakesan
(74) *Attorney, Agent, or Firm* — Withrow & Terranova, PLLC

(57) ABSTRACT

A method and system for detecting malicious behavior from smart appliances within a network. Smart appliances have a certain level of intelligence that allows them to perform a specific role more effectively and conveniently. Network traffic data and identification data is collected about smart appliances within a network. The data is sent to a behavior analysis engine, which computes confidence levels for anomalies within the network traffic that may be caused by malicious behavior. If the behavior analysis engine determines that malicious behavior is present in the network, it sends an instruction to a network traffic hub to block network traffic relating to the anomaly. In some embodiments, network traffic is blocked based on source-destination pairs. In some embodiments, network traffic is blocked (Continued)

from a device outside the network that is determined to be malicious.

17 Claims, 9 Drawing Sheets

Related U.S. Application Data continuation of application No. 14/948,160, filed on Nov. 20, 2015, now Pat. No. 10,230,740.

(60) Provisional application No. 62/150,684, filed on Apr. 21, 2015.

(58) Field of Classification Search
USPC .......................................................... 726/23
See application file for complete search history.

(56) References Cited

U.S. PATENT DOCUMENTS

| | | | |
|---|---|---|---|
| 8,490,190 B1 | 7/2013 | Hernacki et al. | |
| 8,528,084 B1* | 9/2013 | Dingle | G06F 16/35 726/22 |
| 8,595,845 B2* | 11/2013 | Basavapatna | G06F 21/577 705/38 |
| 8,832,832 B1* | 9/2014 | Visbal | H04L 63/1441 726/22 |
| 8,850,428 B2* | 9/2014 | Dotan | G06F 9/455 711/114 |
| 8,918,473 B1* | 12/2014 | O'Connor | H04L 67/02 709/206 |
| 8,923,186 B1* | 12/2014 | daCosta | H04W 4/70 370/312 |
| 8,959,643 B1 | 2/2015 | Invernizzi et al. | |
| 9,294,497 B1* | 3/2016 | Ben-Or | H04L 63/1433 |
| 9,578,052 B2* | 2/2017 | Cp | H04L 63/145 |
| 9,614,865 B2* | 4/2017 | Teddy | H04L 63/145 |
| 9,704,318 B2* | 7/2017 | Zakaria | G07C 9/00309 |
| 9,774,507 B2* | 9/2017 | Britt | H04W 4/70 |
| 10,356,045 B2 | 7/2019 | de Alvarenga Bastos | |
| 2003/0101358 A1* | 5/2003 | Porras | G06F 21/55 726/4 |
| 2003/0115446 A1* | 6/2003 | Simon | G06F 21/604 713/100 |
| 2005/0050338 A1* | 3/2005 | Liang | G06F 21/56 713/188 |
| 2005/0286518 A1 | 12/2005 | Park et al. | |
| 2006/0002324 A1* | 1/2006 | Babbar | H04L 61/2092 370/325 |
| 2006/0048224 A1* | 3/2006 | Duncan | G06F 21/10 726/22 |
| 2006/0067216 A1* | 3/2006 | Lalonde | H04L 41/142 370/230 |
| 2006/0288015 A1* | 12/2006 | Schirripa | G06F 16/951 |
| 2007/0064617 A1* | 3/2007 | Reves | H04L 63/1425 370/252 |
| 2007/0064689 A1 | 3/2007 | Shin et al. | |
| 2007/0199076 A1* | 8/2007 | Rensin | H04L 29/06027 726/27 |
| 2008/0307079 A1 | 12/2008 | Choi et al. | |
| 2009/0027229 A1* | 1/2009 | Fortson | H04Q 9/00 340/870.07 |
| 2009/0260083 A1* | 10/2009 | Szeto | H04L 63/0263 726/22 |
| 2010/0010963 A1 | 4/2010 | Mahaffey | |
| 2010/0100963 A1* | 4/2010 | Mahaffey | G06F 21/564 726/25 |
| 2010/0271935 A1* | 10/2010 | Allasia | H04L 12/433 370/222 |
| 2010/0299173 A1* | 11/2010 | Zampiello | G06Q 30/0246 705/344 |
| 2011/0013591 A1* | 1/2011 | Kakumaru | H04W 36/0016 370/331 |
| 2011/0047597 A1* | 2/2011 | Mahaffey | G06F 21/564 726/3 |
| 2011/0047620 A1* | 2/2011 | Mahaffey | G06F 21/564 726/23 |
| 2012/0185945 A1* | 7/2012 | Andres | G06F 21/56 726/25 |
| 2012/0291087 A1* | 11/2012 | Agrawal | G06F 21/55 726/1 |
| 2012/0306661 A1 | 12/2012 | Xue et al. | |
| 2012/0311659 A1* | 12/2012 | Narain | G06F 21/629 726/1 |
| 2013/0145466 A1* | 6/2013 | Richard | G06F 21/562 726/23 |
| 2013/0160129 A1 | 6/2013 | Sartin et al. | |
| 2013/0227636 A1* | 8/2013 | Bettini | H04W 12/12 726/1 |
| 2013/0298192 A1* | 11/2013 | Kumar | G06F 21/52 726/3 |
| 2014/0007238 A1* | 1/2014 | Magee | G06F 21/577 726/24 |
| 2014/0143827 A1* | 5/2014 | Edery | G06F 21/51 726/1 |
| 2014/0189861 A1* | 7/2014 | Gupta | H04L 63/08 726/22 |
| 2014/0201806 A1* | 7/2014 | Kumar | H04L 63/1416 726/1 |
| 2014/0279768 A1* | 9/2014 | Rash | G06N 5/02 706/14 |
| 2014/0283065 A1* | 9/2014 | Teddy | H04L 63/145 726/23 |
| 2014/0289853 A1* | 9/2014 | Teddy | H04L 63/1416 726/23 |
| 2015/0013000 A1* | 1/2015 | Linnakangas | H04L 63/08 726/14 |
| 2015/0020188 A1 | 1/2015 | Segal et al. | |
| 2015/0096024 A1 | 4/2015 | Haq et al. | |
| 2015/0123813 A1* | 5/2015 | Hernandez-Rosas | A61B 5/14532 340/870.02 |
| 2015/0212567 A1* | 7/2015 | Torii | G06F 1/3215 713/323 |
| 2015/0229664 A1* | 8/2015 | Hawthorn | H04L 63/1433 726/25 |
| 2015/0304280 A1* | 10/2015 | Marshall | H04L 63/0227 726/11 |
| 2015/0358285 A1 | 12/2015 | Ellard et al. | |
| 2016/0035183 A1* | 2/2016 | Buchholz | G07F 17/3225 463/25 |
| 2016/0065620 A1* | 3/2016 | Liu | H04L 63/1441 726/1 |
| 2016/0092847 A1* | 3/2016 | Buchbinder | G06Q 10/20 705/26.8 |
| 2016/0095060 A1* | 3/2016 | Seddighrad | H04W 52/0225 370/311 |
| 2016/0197786 A1* | 7/2016 | Britt | H04W 4/70 370/255 |
| 2016/0197798 A1* | 7/2016 | Britt | H04W 4/70 370/254 |
| 2016/0198536 A1* | 7/2016 | Britt | H05B 47/19 315/149 |
| 2016/0212165 A1* | 7/2016 | Singla | G06F 21/577 |
| 2016/0239649 A1* | 8/2016 | Zhao | G06F 21/316 |
| 2016/0269436 A1 | 9/2016 | Danielson et al. | |
| 2016/0292938 A1* | 10/2016 | Zakaria | G07C 9/00571 |
| 2016/0295364 A1* | 10/2016 | Zakaria | H04W 4/023 |
| 2016/0315909 A1* | 10/2016 | von Gravrock | H04L 12/283 |
| 2016/0315955 A1* | 10/2016 | Beatty | H04L 63/1416 |
| 2016/0323283 A1* | 11/2016 | Kang | H04L 63/08 |
| 2016/0353305 A1 | 12/2016 | Zakaria et al. | |
| 2016/0379486 A1 | 12/2016 | Taylor | |
| 2017/0126704 A1* | 5/2017 | Nandha Premnath | H04L 63/145 |
| 2017/0337813 A1 | 11/2017 | Taylor | |
| 2018/0096024 A1* | 4/2018 | Bitting | G06F 21/6218 |
| 2019/0013958 A1 | 1/2019 | von Gravrock et al. | |

(56) References Cited

U.S. PATENT DOCUMENTS

2019/0149563 A1 5/2019 Beatty et al.
2019/0281020 A1 9/2019 de Alvarenga Bastos

OTHER PUBLICATIONS

Xu, K. et al., "Characterizing Home Network Traffic: An Inside View," Personal and Ubiquitous Computing, Apr. 2014, pp. 967-975, vol. 18, No. 4.
United States Office Action, U.S. Appl. No. 14/948,160, dated Aug. 3, 2017, 43 pages.
United States Office Action, U.S. Appl. No. 14/948,106, dated Apr. 30, 2018, 38 pages.
Applicant-Initiated Interview Summary for U.S. Appl. No. 14/948,160, dated Jul. 30, 2018, 7 pages.
Notice of Allowance and Examiner-Initiated Interview Summary for U.S. Appl. No. 14/948,160, dated Oct. 17, 2018, 77 pages.
Supplemental Notice of Allowance for U.S. Appl. No. 14/948,160, dated Nov. 8, 2018, 5 pages.
Non-Final Office Action for U.S. Appl. No. 16/128,229, dated Jul. 5, 2019, 53 pages.
Notice of Allowance and Examiner-Initiated Interview Summary for U.S. Appl. No. 16/128,229, dated Oct. 17, 2019, 85 pages.
United States Office Action, U.S. Appl. No. 16/246,526, dated Aug. 1, 2019, 46 pages.
Final Office Action for U.S. Appl. No. 16/246,526, dated Nov. 25, 2019, 135 pages.
Notice of Allowance and Examiner-Initiated Interview Summary for U.S. Appl. No. 16/246,526, dated Feb. 12, 2020, ? pages.
United States Office Action, U.S. Appl. No. 15/099,526, dated May 4, 2017, 40 pages.
Applicant-Initiated Interview Summary for U.S. Appl. No. 15/099,526, dated Aug. 1, 2017, 3 pages.
United States Office Action, U.S. Appl. No. 15/099,526, dated Aug. 10, 2017, 40 pages.
United States Office Action, U.S. Appl. No. 15/099,526, dated Feb. 23, 2018, 40 pages.
Notice of Allowance for U.S. Appl. No. 15/099,526, dated Aug. 31, 2018, 32 pages.
Supplemental Notice of Allowance for U.S. Appl. No. 15/099,526, dated Oct. 19, 2018, 4 pages.
Examination Search Report for Canadian Patent Application No. 2,983,429, dated Jul. 13, 2018, 4 pages.
Canadian Intellectual Property Office, Examiner Requisition, Canadian Application No. 2,983,429, dated Jan. 24, 2019, 5 pages.
European Extended Search Report, European Application No. 16783660.0, dated Sep. 26, 2018, 8 pages.
Examination Report for European Patent Application No. 16783660.0, dated Feb. 21, 2020, 4 pages.
PCT International Search Report and Written Opinion, PCT Application No. PCT/US16/28150, dated Jul. 21, 2016, 19 pages.
International Preliminary Report on Patentability for PCT Application No. PCT/US16/28150, dated Nov. 2, 2017, 13 pages.
Applicant-Initiated Interview Summary for U.S. Appl. No. 14/948,160, dated Jul. 20, 2017, 11 pages.
United States Office Action, U.S. Appl. No. 14/948,160, dated Apr. 19, 2017, 47 pages.
Non-Final Office Action for U.S. Appl. No. 16/426,684, dated Oct. 22, 2020, 19 pages.
Non-Final Office Action for U.S. Appl. No. 15/377,856, dated Jun. 1, 2017, 16 pages.
Final Office Action for U.S. Appl. No. 15/377,856, dated Sep. 27, 2017, 15 pages.
Non-Final Office Action for U.S. Appl. No. 15/377,856, dated Apr. 16, 2018, 17 pages.
Final Office Action for U.S. Appl. No. 15/377,856, dated Nov. 8, 2018, 13 pages.
Advisory Action and Interview Summary for U.S. Appl. No. 15/377,856, dated Mar. 14, 2019, 6 pages.
Notice of Allowance and Interview Summary for U.S. Appl. No. 15/377,856, dated Apr. 3, 2019, 17 pages.
International Search Report and Written Opinion for PCT Application No. PCT/US2016/066406, dated Feb. 27, 2017, 14 pages.
International Preliminary Report on Patentability for International Patent Application No. PCT/US2016/066406, dated Jun. 28, 2018, 5 pages.
Final Office Action for U.S. Appl. No. 16/426,684, dated Mar. 29, 2021, 21 pages.
Advisory Action for U.S. Appl. No. 16/426,684, dated Jun. 16, 2021, 3 pages.
Intention to Grant for European Patent Application No. 16783660.0, dated Jul. 6, 2021, 105 pages.
Notice of Allowance and Examiner-Initiated Interview Summary for U.S. Appl. No. 16/426,684, dated Jul. 26, 2021, 14 pages.
Corrected Notice of Allowability for U.S. Appl. No. 16/426,684, dated Jul. 30, 2021, 10 pages.

\* cited by examiner

NETWORK SECURITY ANALYSIS FOR SMART APPLIANCES

CROSS REFERENCE TO RELATED APPLICATIONS

This application is a continuation of U.S. application Ser. No. 16/246,526, filed Jan. 13, 2019, now U.S. Pat. No. 10,609,051, which is a continuation of U.S. application Ser. No. 14/948,160, filed Nov. 20, 2015, now U.S. Pat. No. 10,230,740, which application claims the benefit of U.S. Provisional Application No. 62/150,684, filed Apr. 21, 2015, all of which are incorporated by reference in their entirety.

BACKGROUND

"Smart" appliances are devices that can connect to a network to communicate with other devices while performing a very specific role, for example, within a home or small office. Smart appliances have some specified basic computing processing intelligence but otherwise lack capability of a full-fledged computing system such as a personal computer, phone or tablet. Examples of smart appliances include refrigerators, dishwashers, washers, dryers, thermostats, digital video recorders, DVD players, and printers. By adding a certain level of intelligence to these devices, smart appliances can be made more effective or more convenient for the user. For example, a smart dishwasher might be able to communicate with a smartphone in the local network so the user can start the dishwasher from anywhere in a house.

Some smart appliances can communicate with devices outside of the local network. A smart appliance may receive software updates from a remote server to perform more effectively or it might receive information that it uses to perform more effectively. For example, a smart thermostat might receive information about the weather from an internet based weather service and use that information to adjust the heat settings of a house. The smart appliance might communicate with a specific server designated by the manufacturer, or it might communicate with third-party web servers via the internet.

However, smart appliances are vulnerable to security breaches that could embed code on the smart appliance that causes it to perform malicious behavior. For example, smart appliances infected with malicious code might be used to perform a Distributed Denial of Service (DDoS) attack on a remote web server or they could be used to send user information to unauthorized recipients. Due to limited access that users have to the functionality of smart appliances, it could be very difficult for a user to determine, on their own, whether a smart appliance is performing malicious behavior. Traditional approaches to protect networked devices from malicious code include anti-virus software installed on computers that monitors processes on the computer to determine if those processes might be exhibiting malicious behavior. Anti-virus software is typically installed on full-fledged computing systems such as personal computers, smartphones and tablets. However, smart appliances do not have the computing intelligence or resources to support anti-virus software and often do not allow users to install additional software onto the smart appliance. Therefore, anti-virus software is ill-suited to protect smart appliances from being infected with malicious code.

SUMMARY

Described is a system (and method and computer readable storage medium) configured to analyze network related traffic from a smart appliance and determine whether malicious behavior is detected on the smart appliance. The system is configured to collect information about a smart appliance network traffic and determine if the smart appliance is exhibiting malicious behavior. The system routes smart appliance traffic via a network smart appliance through a network traffic hub. The network traffic hub collects data about the traffic. In some embodiments, the network traffic data is aggregated based on pairs of addresses in the network traffic that have communicated with each other, hereinafter called source-destination pairs, and the bandwidth of the communication between each source-destination pair is collected.

To aid in the analysis of the network traffic, identification data is collected about the smart appliances in the local network. The identification data may match an internet address in the local network with a specific smart appliance, as well as specifying a type for the smart appliance. In some embodiments, the identification data can be collected passively by extracting information out of intercepted communications. In some embodiments, the identification data can be collected actively by the network traffic hub. In these embodiments, the network traffic hub transmits a communication to a smart appliance and extracts identification data out of a response sent from the smart appliance.

The network traffic data and the identification data are sent to a behavior analysis engine. The behavior analysis engine is configured to determine whether malicious behavior is present in the local network. In some embodiments, the behavior analysis engine is configured within a web server or cluster of web servers that are remote from the local network. The behavior analysis engine extracts features from the network traffic data and identification data, and uses those features to find anomalies within the local network. The anomalies correspond to suspicious behaviors that could be caused by malicious code. The behavior analysis engine determines a confidence level that an anomaly exists and is caused by malicious code. In some embodiments, the confidence level is represented as a numerical confidence score. Some examples of anomaly analysis include analyzing network traffic between source-destination address pairs and/or network traffic associated with a single smart appliance or internet address.

In some embodiments, network traffic data and identification data from multiple network traffic hubs in multiple local networks are used to analyze anomalies within those networks. Examples of anomalies include a significant change in bandwidth between a source-destination address pair, traffic to/from an internet address known to have a bad reputation, and models developed by a user for specific cases.

If the behavior analysis engine generates a confidence level (or score) corresponding to presence of malicious behavior in the local network, the behavior analysis engine instructs the network traffic hub to block network traffic in the local network. In some embodiments, the behavior analysis engine instructs the network traffic hub to block traffic between a specific internet address within the local network and a specific address outside of the local network. In some embodiments, the behavior analysis engine blocks traffic to and from an internet address outside of the local network if it has determined that the internet address is malicious. In some embodiments, when the behavior analysis engine is moderately confident that an anomaly represents malicious behavior, but is not confident enough to block traffic, it might alert the user to the anomaly and await instructions from the user about whether to block traffic in the local network.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
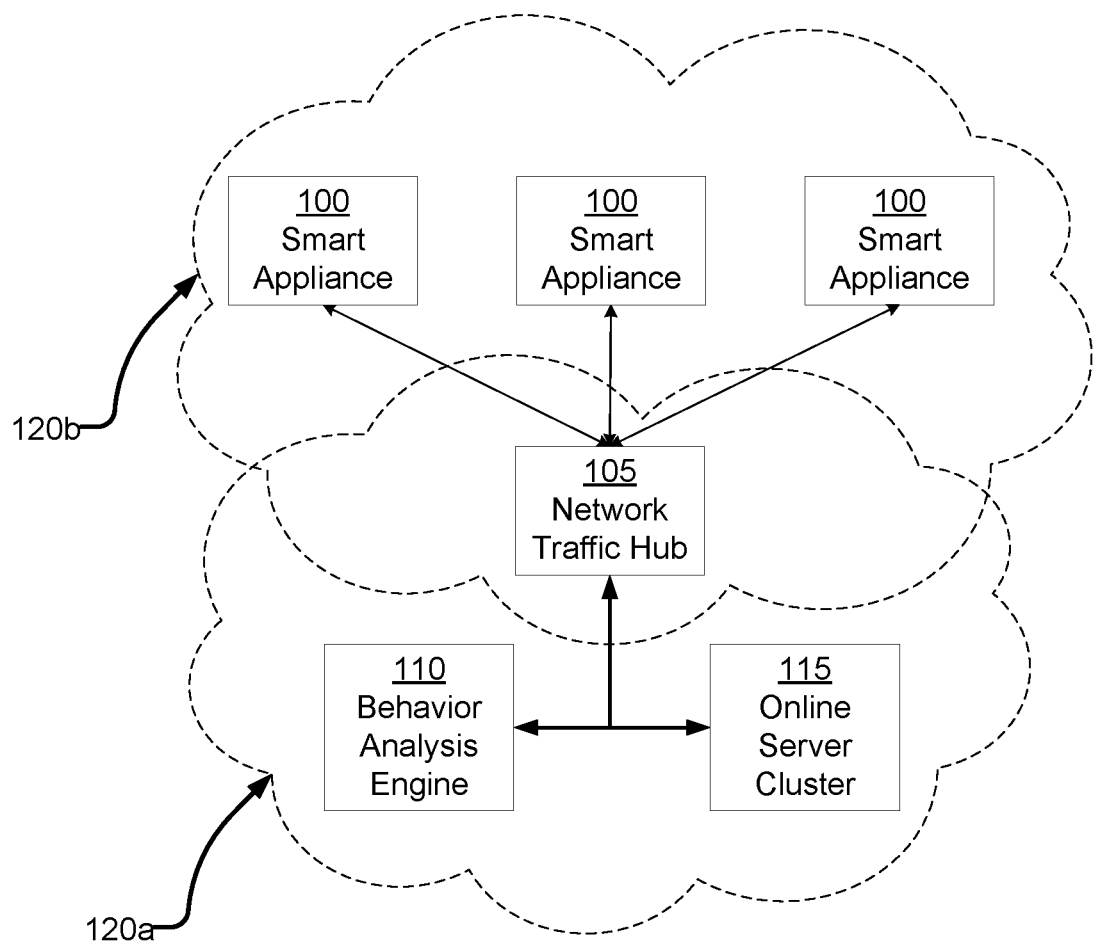
FIG. 1 is a block diagram illustrating a networked computing environment, in accordance with an example embodiment.

Referring now to Figure (FIG. 1, it shows a block diagram of a networked computing environment in accordance with an example embodiment. The functionality of the modules in FIG. 1 can be performed by additional, fewer, or different modules and the functionality of the modules can be divvied between modules differently from how it is described below. The networked computing environment in FIG. 1 shows one or more smart appliances 100, a network traffic hub 105, a behavior analysis engine 110, an online server cluster 115, and a cloud network 120a, and a local network 120b.

Smart appliances 100 are electronic, networked devices with a limited level of intelligence. Smart appliances 100 are capable of performing moderate amounts of computation that is specific, but limited in scope. The smart appliances 100 are not full-fledged computing systems, such as personal computers, smartphones, or tablets. Instead, each smart appliance 100 performs some specific role and the limited intelligence is focused on having the smart appliance 100 perform that specific role effectively. Accordingly, a smart appliance 100 does not have extensive computing resources, e.g., a powerful processor or large quantity of memory. Moreover, keeping computing resources minimal helps keep costs down for the appliances, many of which are staples, for example, in homes or small offices. Examples of appliances that can be smart appliances 100 are refrigerators, freezers, dishwashers, washers, dryers, thermostats, digital video recorders (DVRs), DVD players, and printers. A smart appliance 100 typically includes a controller or low power processor (generally, processor), a limited amount of memory, and a network interface, which is used to communicate with other networked devices.

The architecture of the smart appliances 100 is discussed below. The smart appliances 100 can use local network 120b to communicate with other devices. For example, a smart dishwasher can be configured to transmit an alert to a computer or a smartphone on the local network 120b that its cleaning cycle is completed. As another example, a smart light switch can be configured to communicate with a motion sensor via the local network 120b to determine if a person is in a room and whether to power the lights in that room. The smart appliances 100 can also communicate with devices outside of local network 120b via the internet. A smart appliance 100 can, for example, be configured to receive software updates from remote servers to improve or update is current control functions. Additionally, a smart appliance might receive data via the internet that it uses to make decisions (e.g. a smart thermostat might receive weather data to determine heating and cooling settings for a building). In some embodiments, a smart appliance 100 can be configured to receive instructions from a remote web server via the internet. For example, a smart clock can be configured to receive an instruction from a known server to change the time it displays when daylight savings starts or ends.

The network traffic hub 105 collects information about the local network 120b, including data about the network traffic through local network 120b and data identifying the smart appliances 100 in the local network 120b. The network traffic hub 105 is also capable of receiving traffic control instructions from the behavior analysis engine 115 and blocking traffic through the local network 120b based on those the traffic control instructions. In some embodiments, the functionality of the network traffic hub 105 is performed by a device that is a part of the local network 120b. In other embodiments, some or all of the functionality of the network traffic hub is performed in the cloud network 120a by the online server cluster 115

The network traffic hub 105 monitors all traffic that travels through the local network 120b. In some embodiments, the network traffic hub 105 is a device that is a part of the local network 120b. In some embodiments, the network traffic hub 105 can comprise multiple devices in the local network 120b that, in conjunction, monitors all traffic that flows through the local network 120b. In some embodiments, the network traffic hub 105 intercepts traffic in the local network 120b by signaling the smart appliances 100 that the network traffic hub 105 is a router. The smart appliances 100 transmit all of their network traffic to the network traffic hub 105. In some embodiments, the network traffic hub 105 uses an address resolution protocol (ARP) announcement to signal the smart appliances 100 to transmit network traffic to the network traffic hub 105. In some embodiments, the local network 120b can be structured such that all network traffic passes through the network traffic hub 105, allowing the network traffic hub 105 to physically intercept the network traffic. Additional functionality of the network traffic hub 105 is further discussed below.

The behavior analysis engine 110 is configured to receive network traffic data and identification data from the network traffic hub 105. The behavior analysis engine uses that data to determine whether any of the smart appliances 100 in the local network 120b are exhibiting malicious behavior. If the behavior analysis engine 110 is confident that a smart appliance 100 is exhibiting malicious behavior, then the behavior analysis engine 110 sends traffic control instructions to the network traffic hub 105 to block traffic to the smart appliance 100. In some embodiments, the behavior analysis engine 110 is a part of a cloud network 120a and is stored and executed by an online server cluster 115. Additional functionality of the behavior analysis engine 115 is further discussed below.

The online server cluster 115 is configured to store data, perform computations, and transmit data to other devices through cloud network 120a. The online server cluster 115 may comprise a single computing device, or a plurality of computing devices configured to allow for distributed computations. In some embodiments, the behavior analysis engine 110 is stored and executed by the online server cluster 115. In some embodiments, certain functionality of the network traffic hub 105 is performed on the online server cluster 115. In some embodiments, the online server cluster 115 stores data that is used by the behavior analysis engine 110 and the network traffic hub 105.

The networked computing environment in FIG. 1 can be grouped around the network traffic hub 105. In one example embodiment, the network traffic hub 105 is part of cloud network 120a. In another example embodiment, the network traffic hub 105 is part of a local network 120b. The cloud network 120a comprises the behavior analysis engine 110, the online server cluster 115 and, in some embodiments, the network traffic hub 105. The cloud network 120a is connected to the local network 120b via the internet. The local network 120b comprises the smart appliances 100. In some embodiments, some or all of the functionality of the network traffic hub 105 is performed by a device in the local network 120b. The local network 120b can be used for a number of purposes, including a home network or a network used by a business. The local network 120b is connected to the internet, allowing devices within the local network 120b, including smart appliances 100, to communicate with devices outside of the local network 120b. The local network 120b is connected to cloud network 120a via the internet. The local network 120b could be a private network that requires devices to present credentials to join the network, or it could be a public network allowing any device to join. In some embodiments, other devices, like personal computers, smartphones, or tablets, may join local network 120b.

Example Network Traffic Hub

Figure 2:
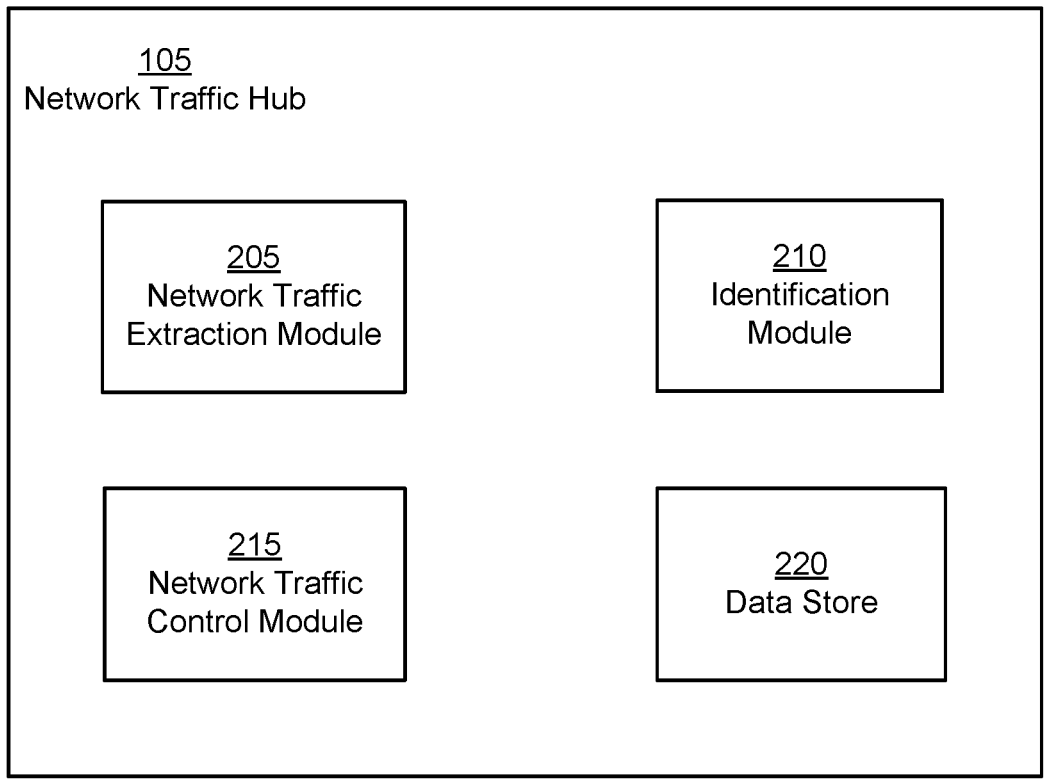
FIG. 2 is a high level block diagram illustrating a network traffic hub, in accordance with an example embodiment.

FIG. 2 is a block diagram illustrating an example embodiment of the network traffic hub 105. The functionality of the modules in FIG. 2 can be performed by additional, fewer, or different modules and the functionality of the modules can be divvied between modules differently from how it is described below.

The network traffic hub 105 comprises a network traffic extraction module 205, and identification module 210, a network traffic control module 215, and a data store 220. The network traffic extraction module 205 receives all network traffic that passes through the network traffic hub 105 and collects data about the network traffic. The network traffic extraction module 205 stores the network traffic data in the data store 220 and sends the network traffic data to the behavior analysis engine 110. In some embodiments, the network traffic extraction module 205 transmits the network traffic data to the behavior analysis engine 110 periodically on a regular time interval (e.g. every second). In some embodiments, the network traffic extraction module 205 transmits the network traffic data to the behavior analysis engine 110 in parts.

The network traffic extraction module 205 stores important features about the network traffic in the network traffic data. For example, the network traffic data could contain source internet addresses, destination internet addresses, packet sizes, packet counts, and bandwidth between a source internet address and a destination internet address. In some embodiments, the internet addresses comprise an internet address for a smart appliance and a port number for a process on the smart appliance. In some embodiments, the network traffic extraction module 205 finds pairs of addresses in the network traffic that have communicated with each other, hereinafter referenced as source-destination pairs, and aggregates the features of the network traffic based on those source-destination pairs when generating the network traffic data. In some embodiments, the network traffic extraction module 205 computes the bandwidth between source-destination pairs and the bandwidths in the network traffic data.

In some embodiments, the network traffic extraction module 205 identifies network traffic as executable code that is being downloaded by a smart appliance 100. The network traffic module 205 instructs the network traffic control module 215 to temporarily block the network traffic and the network traffic extraction module 205 notifies the behavior analysis engine 110. The network traffic control module 215 awaits instructions from the behavior analysis engine 110 about whether to allow the download to continue. If the behavior analysis engine 110 determines that the code being downloaded is safe, it instructs the network traffic control module 215 to allow the download to continue. If the behavior analysis engine 110 determines that the code being downloaded is malicious, it instructs the network traffic control module 215 to continue to block the download.

The identification module 210 is configured to gather identification information and use the identification information to generate identification data. Identification information is information included in traffic within the local network 120b that can be used to identify smart appliances within the local network 120b. Identification information can be used directly to identify smart appliances 100 (e.g. a Dynamic Host Configuration Protocol (DHCP) request with the type of a smart appliance), or can be used to infer the identity and type of smart appliances 100.

The identification data generated by the identification module 210 comprises data that matches smart appliances 100 on the local network 120b with internet addresses. The identification data also comprises data about the type of each smart appliance 100 on the local network 120b. For example, the identification data might specify that a smart appliance is a smart thermostat or it might specify the brand of the smart appliance. In some embodiments, the identification data includes data that identifies processes on the smart appliances 100 and the port numbers associated with those processes. The identification module 210 transmits the identification data to the behavior analysis engine 110. In some embodiments, the identification module 210 is, in whole or in part, stored on a device within the local network 120b. In some embodiments, the identification module 210 is, in whole or in part, stored within the online server cluster 115 on the cloud network 120a.

In some embodiments, the identification module 210 is configured to gather identification information actively by transmitting messages to the smart appliances 100, and extracting identification information from responses to the initial messages. In some embodiments, the identification module 210 sends the initial messages to the smart appliances 100 in the local network 120b using a broadcast protocol. The simple service discovery protocol (SSDP) and port-knocking on active listening ports are two example methods that the identification module 210 could use to actively gather identification information.

In some embodiments, the identification module 210 gathers the identification information passively from the network traffic received by the network traffic hub 105. The identification module 210 analyzes the network traffic and, if it finds messages that contain identification information, it extracts that the identification information out of the messages. In some embodiments, the identification module 210 extracts identification information out of DHCP requests, Transmission Control Protocol (TCP) signatures, and Hypertext Transfer Protocol (HTTP) headers. For example, a smart thermostat may include its vendor information in a DHCP request, which can be used, along with other information, by the identification module 210 to determine what the smart thermostat is.

The identification module 210 is configured to use the identification information to generate identification data. The process by which the identification module 210 generates the identification data is further discussed below. After generating the identification data, the identification module 210 transmits the identification data to the behavior analysis engine 105. In some embodiments, the network traffic hub 105 transmits the identification data to the behavior analysis engine 110 when certain events occur, such as when a smart appliance 100 is assigned a new internet address. In some embodiments, the network traffic hub 105 transmits the identification data to the behavior analysis engine 110 periodically at a regular time interval.

The network traffic control module 215 blocks traffic in the local network 120b based on instructions from the behavior analysis engine 110. The network traffic control module 215 blocks network traffic by preventing the network traffic hub 105 from forwarding on the received traffic to its intended destination. In embodiments where the network traffic hub 105 receives traffic for routing, the network traffic control module 215 blocks traffic by preventing the network traffic hub 105 from forwarding network traffic. In embodiments where the network traffic hub 105 physically intercepts traffic entering or exiting the local network 120b, the network traffic control module 215 blocks traffic by preventing the network traffic hub 105 from allowing the traffic to continue into or out of the local network 120b. The network traffic control module 215 may block traffic based on the source address, the destination address, a source-destination pair, the smart appliance associated with the traffic, traffic size, or any feature or combination of features of the network traffic. In some embodiments, the network traffic control module 215 blocks traffic based on an internet address and a port number corresponding to a process on a smart appliance 100 within the local network 120b or a process on a device external to the local network 120b.

The data store 220 is used by the network traffic hub 105 to store code or data that the network traffic hub 105 uses. The data store 220 can be used by the network traffic extraction module 205 or the identification module 210 to hold network traffic data or identification data before it is sent to the behavior analysis engine 110. The data store 220 could be used by the network traffic control module 215 to store instructions from the behavior analysis engine 110 about traffic to block. The data store 220 could also store code that is executed by the network traffic hub 105.

Example Behavioral Analysis Engine

Figure 3:
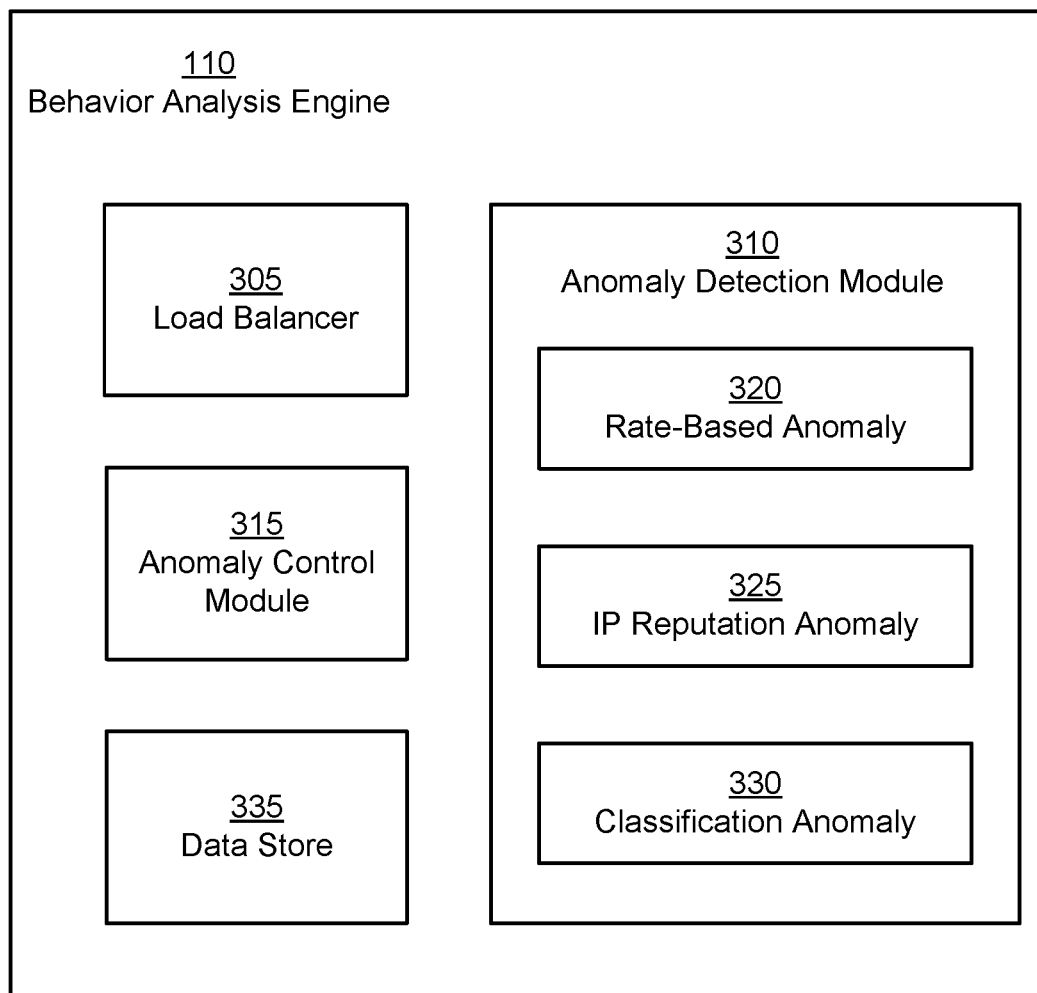
FIG. 3 is a high level block diagram illustrating a behavior analysis engine, in accordance with an example embodiment.

FIG. 3 is a block diagram illustrating a behavior analysis engine in accordance with an embodiment. The functionality of the modules in FIG. 3 can be performed by additional, fewer, or different modules and the functionality of the modules can be divvied between modules differently from how it is described below.

The behavior analysis engine 110 comprises a load balancer 305, an anomaly detection module 310, and an anomaly control module 315. The load balancer 305 is configured to balance execution load for the behavior analysis engine 110. The load balancer 305 helps the behavior analysis engine 110 perform efficiently by assigning work to nodes in the online server cluster 115 evenly and efficiently. The load balancer 305 helps the behavior analysis engine 110 to efficiently analyze the network traffic data and the identification data to find potential malicious behavior within the local network 120b. For example, the load balancer 305 might use task-scheduling to ensure that tasks are performed in a defined orderly manner.

The anomaly detection module 310 analyzes the network traffic data and the identification data to determine confidence levels that certain anomalies exist in the local network and represent malicious behaviors. Anomalies correspond to activities or behaviors within the local network 120b that would be considered out of the ordinary or presumably expected. Detected anomalies may be caused by malicious code. For example, a smart thermostat communicating with an internet address for a website having weather data for the city in which the thermostat is located would not be an anomaly as such activity would be expected (e.g., adjust thermostat based on outdoor temperature). In contrast, the same thermostat communicating with an internet address for an online shopping website would be considered an anomaly because such an appliance would not be expected to communicate with an online shopping site. It is noted that the existence of an anomaly does not necessarily mean that the anomaly was caused by malicious behavior. For example, using the same example, a smart thermostat communicating with a shopping website might include a feature to order new air filters when it determines they should be replaced. Hence, the anomalies can be correlated with confidence levels that can be predetermined or set provide a further level of context to analyze the communication circumstances.

Example Anomaly Detection Module

The anomaly detection module 310 is configured to extract features out of the network traffic data and the identification data. Some features might be immediately present in the network traffic data and the identification data and is extracted and collected. For example, the anomaly detection module 310 might collect all destination addresses out of the network traffic data. Some of the features can be computationally inferred. For example, the anomaly detection module might sum the packet sizes of all communications into and out of the local network 120b during a time period to find the total bandwidth of the local network 120b for that period of time. In some embodiments, the computed features could be statistical models such as standard deviations, sum of squares, normal distributions, and exponential moving averages/simple moving averages.

In some embodiments, the anomaly detection module 310 is configured to extract features out of the network traffic data and the identification data to determine confidence levels for anomalies related to processes on the smart appliance 100. The analysis can be done on discrete activity or could be done on activity within the smart appliance 100 as a whole.

The anomaly detection module 310 may use information collected over time to determine if an anomaly exists and is caused of malicious behavior. For example, the anomaly detection module 310 might store all network traffic data and identification data received by behavior analysis engine 110 for better context when determining confidence levels. In some embodiments, the anomaly detection module 310 might consider network traffic data and identification data for a specific time period when determining confidence levels. The anomaly detection module 310 may use network traffic data and identification data to detect and evaluate emerging technologies that should be regarded as harmless, or to detect emerging threats that should be regarded as malicious.

The anomaly detection module 310 may use information from sources other than the network traffic hub 105 to determine confidence levels. For example, the anomaly detection module 310 may receive threat intel data that identifies malicious internet addresses, details types of malicious behavior, or generally provides data that helps the anomaly detection module 310 determine the confidence levels. The anomaly detection module 310 may use network traffic data and identification data from multiple network traffic hubs 105 to determine confidence levels. In some embodiments, the anomaly detection module 310 uses information about the nature of websites and internet addresses when determining confidence levels. In some embodiments, the anomaly detection module 310 uses network traffic data, identification data, and other sources to determine the nature of processes on devices external to the local network 120b in order to determine confidence levels for anomalies.

In some example embodiments, the anomaly detection module 310 is configured to receive information about smart appliance behavior from users or manufacturers of smart appliances in order to better determine confidence levels. The information received from the user or the manufacturer may notify the anomaly detection module 310 of a time interval, a bandwidth size, or a location for smart appliance behavior that may be falsely determined to be malicious. For example, a manufacturer of smart appliances could notify the anomaly detection module that the manufacturer is about to release a software update for a particular smart appliance model. Further, the notification can include other pertinent information, for example, that the update will happen during a particular time interval. Accordingly, the anomaly detection module 310 is now able to determine that data traffic between the smart appliance and the network address from where the update is being pushed should not be mistaken for malicious behavior, and accordingly, should have a low confidence level that an anomaly is being observed.

The anomaly detection module 310 in FIG. 3 illustrates three example anomalies. A rate-based anomaly 320 is one where the anomaly detection module 310 determines that the bandwidth between a source-destination pair has increased significantly compared to the typical bandwidth between the source-destination pair. An IP reputation anomaly 325 is one where a smart appliance 100 in the local network 120b communicates with an internet address external to the local network 120b that has a reputation for being malicious. A classification anomaly 330 is one where suspicious behavior from an address outside of the local network is compared to behavior from other addresses outside of the local network to determine if the suspicious behavior is malicious. For example, if an address outside of the local network performs some type of behavior, and other addresses outside of the local network that have been determined to be malicious have performed the same behavior, then the suspicious behavior will be classified as malicious. As noted the anomalies described are examples and are not a complete list of the anomalies that could be considered by the anomaly detection module 310.

In some example embodiments, the anomaly detection module 310 uses numerical scores to represent confidence levels. In one example, the anomaly detection module 310 computes confidence levels in batches. The batches can comprise confidence levels for network traffic data and identification data received during a particular time period. The confidence levels are sent to the anomaly control module 315 when all of the confidence levels have been computed. In some embodiments, confidence levels are sent to the anomaly control module 315 in real time after they are computed. In some embodiments, some confidence levels are sent in batches, and some confidence levels are sent in real time. The confidence levels sent in real time could be more urgent or may not require the context of other scores when the anomaly control module 315 determines whether to block traffic in the local network 120b.

The anomaly control module 315 uses the confidence levels generated by the anomaly detection module 310 to determine whether to block traffic in the local network 120b. In the embodiment described by FIG. 3, the confidence levels are represented using numerical scores. In some embodiments, the anomaly control module uses thresholds to determine if an anomaly exists and represents malicious behavior. If the anomaly control module determines that an anomaly in the local network represents malicious behavior, the anomaly control module 315 sends traffic control instructions to the network traffic hub 105. The particular traffic control instructions might depend on the type of anomaly. For example, if the anomaly is a rate-based anomaly 320, then the anomaly control module 315 might instruct the network traffic hub 105 to block traffic between the source-destination pair. If the anomaly is an IP reputation anomaly 325, then the anomaly control module 315 might instruct the network traffic hub 105 to block traffic that is sent to or from the IP with a malicious reputation. In some embodiments, the anomaly control module 315 blocks traffic associated with a process on a smart appliance 100 or with a process on a device external to the local network 120b. In some embodiments, the anomaly control module 315 might only block traffic for a particular amount of time or during specific time periods.

If the confidence level for a particular anomaly is high enough, anomaly control module 315 instructs the network traffic hub 105 to block traffic. In some embodiments, the anomaly control module 315 notifies the user that it has instructed the network traffic hub 105 to block traffic. In some embodiments, the anomaly control module 315 includes information about the blocked traffic to the user in the notification, such as the source internet address, the destination address, the identity of the smart appliance, the source destination pair, or information about the anomaly. In some embodiments, a user may, after receiving a notification about blocked traffic, override traffic control instructions and allow the traffic to continue to travel through the local network 120b.

In some embodiments, if the confidence level is high but not high enough to block traffic, the anomaly control module 315 notifies the user of the anomaly and awaits instructions as to whether to block traffic related to the anomaly. In some embodiments, the notification can be sent to the user via email or an application installed on a smartphone, tablet, or computer. In some embodiments, if the confidence level is high (e.g., a first predefined level) but not high enough (e.g., below the first predefined level but above a second predefined level associated with low risk) to block traffic, the anomaly control module 315 adds the smart appliances or internet addresses related to the anomaly to a watchlist. The watchlist could comprise smart appliances or internet addresses that have exhibited suspicious behavior in the past, and the watchlist could be used for determining confidence levels for those smart appliances or internet addresses in the future. In some embodiments, the network traffic hub 105 includes additional data relating to smart appliances or addresses on the watchlist in the network traffic data and the identification data.

In some embodiments, the anomaly control module 315 receives a notification from the network traffic hub 105 that software was being downloaded by a smart appliance 100. The notification includes the code that is being downloaded, and the anomaly control module 315 analyzes the code to determine whether it is malicious. In some embodiments, the anomaly control module 315 sends the code to the anomaly detection module 310 for analysis. If the anomaly control module 315 determines that the code is in a safe category (i.e., non-malicious), it instructs the network traffic hub 105 to allow the download to continue. If the anomaly control module 315 determines that the code is malicious, then it instructs the network traffic hub 105 to block the download. The anomaly control module 315 notifies the user that the download has been blocked, including information about what code was being downloaded and why it was blocked. The user may instruct the anomaly control module 315 to allow the download to continue. In some embodiments, the anomaly detection module 310 uses information about code that was blocked when determining confidence levels.

The data store 335 is used by the behavior analysis engine 110 store code or data that the behavior analysis engine uses. The data store 335 can be used to store network traffic data or identification data received from the network traffic hub 105. The data store 335 can be used to store information that the anomaly detection module 310 uses to determine confidence levels for anomalies. The data store 335 can also be used by the anomaly control module 315 to store information that anomaly control module 315 uses to make determinations about anomaly confidence levels.

Example Actions to Respond to Anomalies

Figure 4:
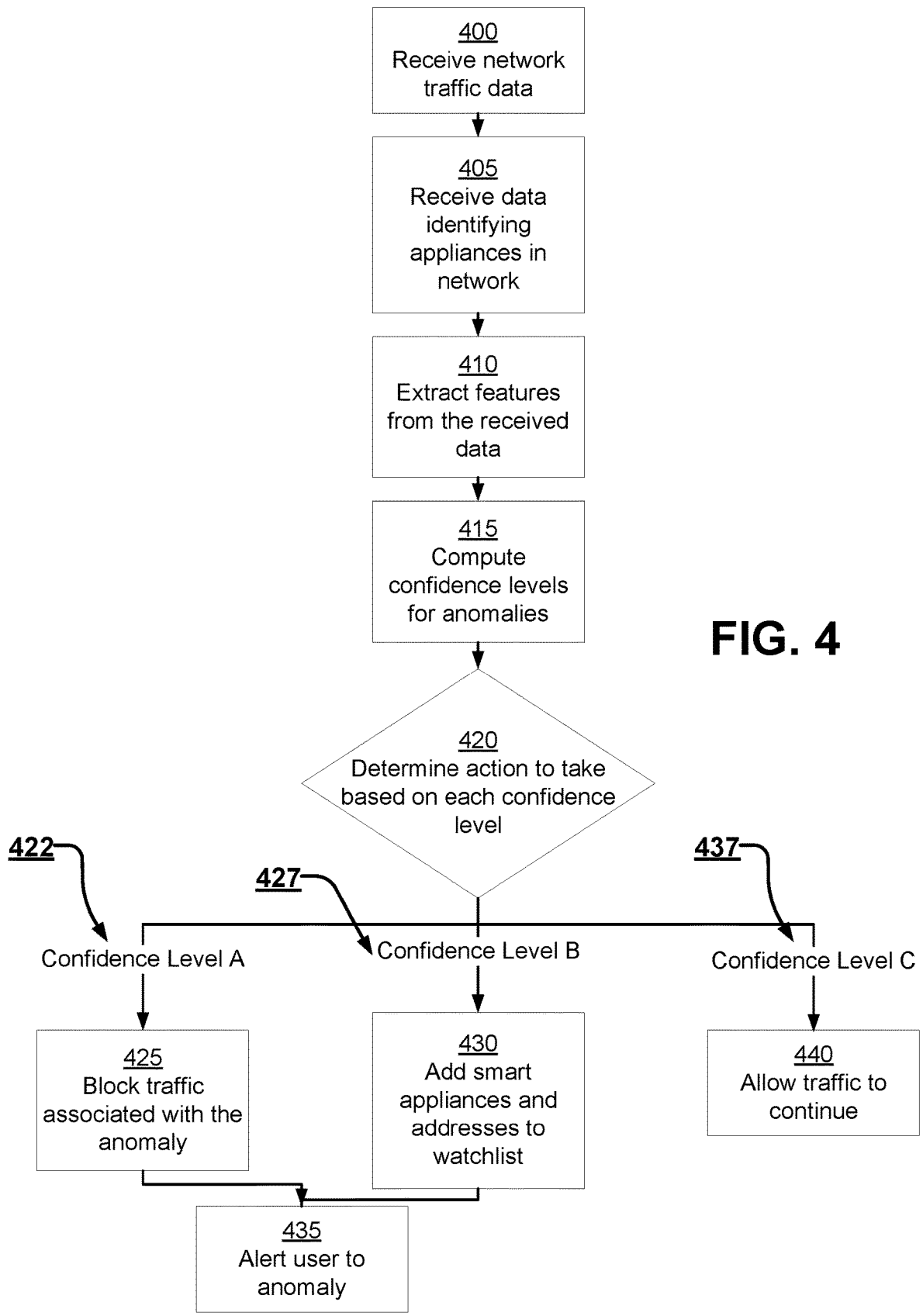
FIG. 4 is a flowchart illustrating a method for identifying and blocking malicious behavior within a local network in accordance with an example embodiment.

FIG. 4 is a flowchart illustrating a method for identifying and blocking malicious behavior within a local network, in accordance with some embodiments. The steps for the method presented in FIG. 4 could be performed in a different order, and the method might include additional, fewer, or different steps. The method can be embodied as instructions stored in a non-transitory computer readable storage medium and executable by a processor and/or controller.

The behavioral analysis engine 110 receives network traffic data 400 from the network traffic hub 105. The network traffic data describes network traffic in local network 120b. In some embodiments, the network traffic data comprises source addresses, destination addresses, bandwidth between those addresses, and packet sizes of the network traffic. In some embodiments, the network traffic hub 105 sends the network traffic data in aggregated parts based on the source/destination pair. In some embodiments, those parts are sent periodically at a regular time interval.

The behavior analysis engine 110 receives identification data 405 from the network traffic hub 105. The identification data comprises information mapping smart appliances 100 in the local network 120b to internet addresses. The identification data also comprises information specifying the types of the smart appliances 100 in the local network 120b. In some embodiments, the network traffic hub 105 transmits the identification data to the behavior analysis engine 110 when certain events occurs, such as when a smart appliance 100 is assigned a new internet address. In some embodiments, the network traffic hub 105 transmits the identification data to the behavior analysis engine 110 periodically at a regular time interval.

The behavior analysis engine 110 extracts important features from the network traffic data and the identification data 410. Extracting the important features could comprise aggregating fields in the data (e.g., collecting the types of smart appliances in the local network 120b). Extracting the important features could also comprise performing computations on the data (e.g. computing the average bandwidth for a source-destination pair). The features could also comprise statistical models of the data (e.g. generating distributions to model traffic flow).

The behavior analysis engine 110 computes confidence levels for anomalies 415 within the local network 120b. Anomalies are behaviors or activities in the local network 120b that could be caused by malicious code. A confidence level is a representation of whether the anomaly exists in the data and whether the anomaly is caused by malicious behavior. In some embodiments, the confidence level is computed as a numerical score. In some embodiments, a confidence level can represent more than one anomaly.

The behavior analysis engine 110 is configured to determine an action to take based on the confidence level of each anomaly 420. In some embodiments, the behavior analysis engine 110 considers the confidence levels for anomalies independently when making a determination. In some embodiments, the behavior analysis engine 110 considers the confidence levels in combination to make a determination. In some embodiments, the behavior analysis engine 110 uses thresholds to make a determination. The behavior analysis engine 110 could make a determination based on the statistical likelihood that the anomaly would occur and not be caused by malicious behavior.

If the behavior analysis engine 110 determines that the confidence level for an anomaly is at Confidence Level A 422, then the behavior analysis engine 110 instructs the network traffic hub 105 to block traffic relating to the anomaly 425. Confidence Level A 422 represents a high level of confidence that the anomaly is caused by malicious behavior. Confidence Level A 422 could be a threshold for a numerical score representing the confidence level.

The behavior analysis engine 110 instructs the network traffic hub 105 to block traffic associated with the anomaly 425 by sending traffic control instructions to the network traffic hub 105. The traffic control instructions could instruct the network traffic hub 105 to block traffic relating to a source-destination pair. In some embodiments, the traffic control instructions instruct the network traffic hub 105 to block traffic coming from or going to a particular address outside of the local network 120b. In some embodiments, the behavior analysis engine 110 notifies the user 435 that network traffic has been blocked.

If the behavior analysis engine 110 determines that the confidence level for an anomaly is at Confidence Level B 427, the behavior analysis engine 110 adds smart appliances and internet addresses associated with the anomaly to a watchlist 430. The behavior analysis engine 110 notifies the user 435 that the smart appliances or internet addresses have been exhibiting suspicious behavior. Confidence Level B 427 represents a high confidence level, but not so high that the behavior analysis engine decides to block traffic associated with the anomaly. In some embodiments, if a smart appliance or internet address associated with a confidence level is already on a watchlist, the confidence level is raised to Confidence Level A 422. In some embodiments, the network traffic hub 105 includes additional information relating to smart appliances and internet addresses on the watchlist in the network traffic data and identification data.

If the behavioral analysis engine 110 determines that the confidence level for an anomaly is at Confidence Level C 437, the network traffic hub 105 allows traffic associated with the anomaly to continue 440. Confidence Level C 437 represents a low confidence level.

Blocking Traffic to a Smart Appliance with Malware

Figure 5A:
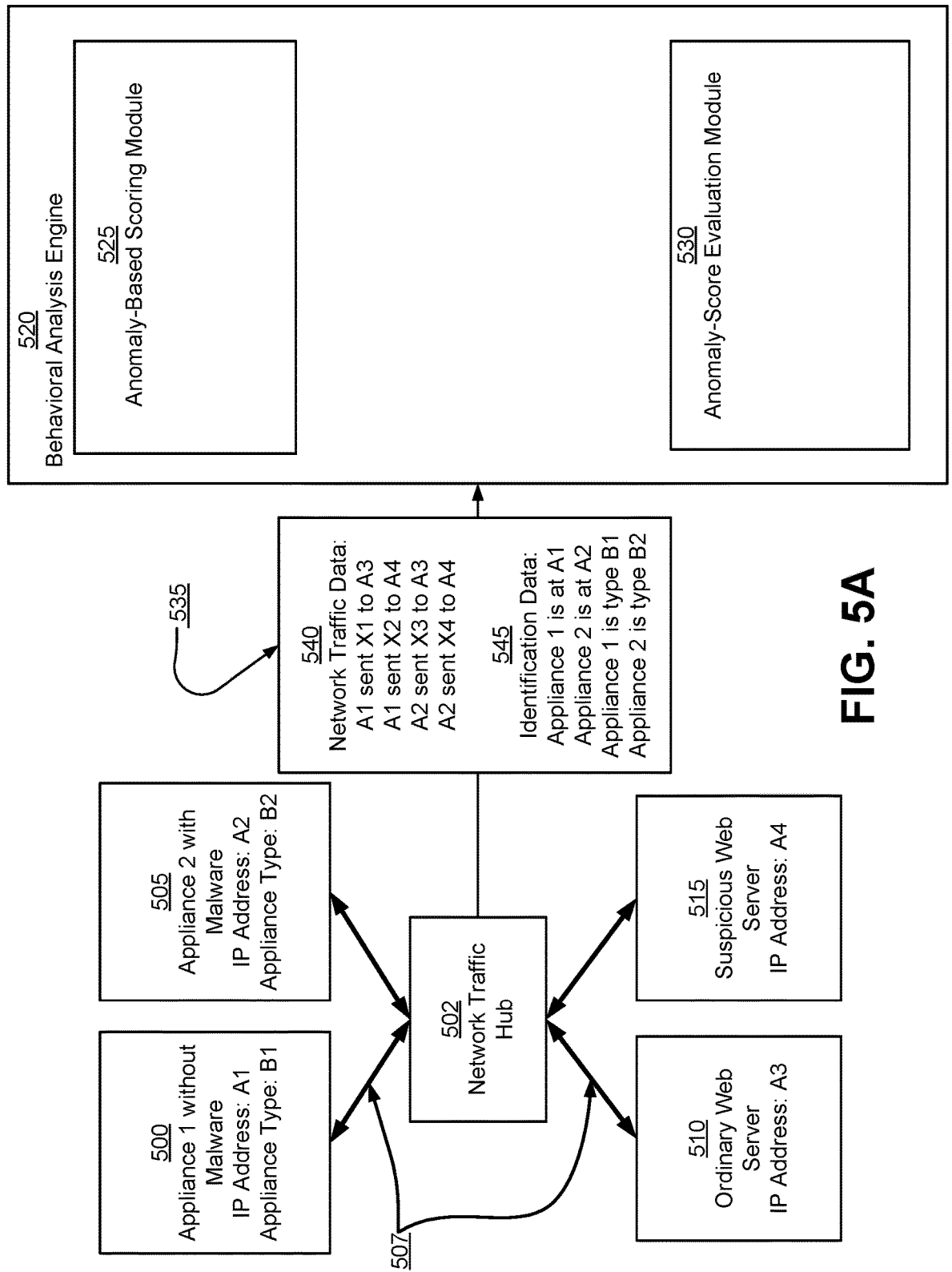
FIG. 5A is a high level block diagram illustrating network traffic data and identification data being sent from a network traffic hub to a behavioral analysis engine, in accordance with an example embodiment.
Figure 5B:
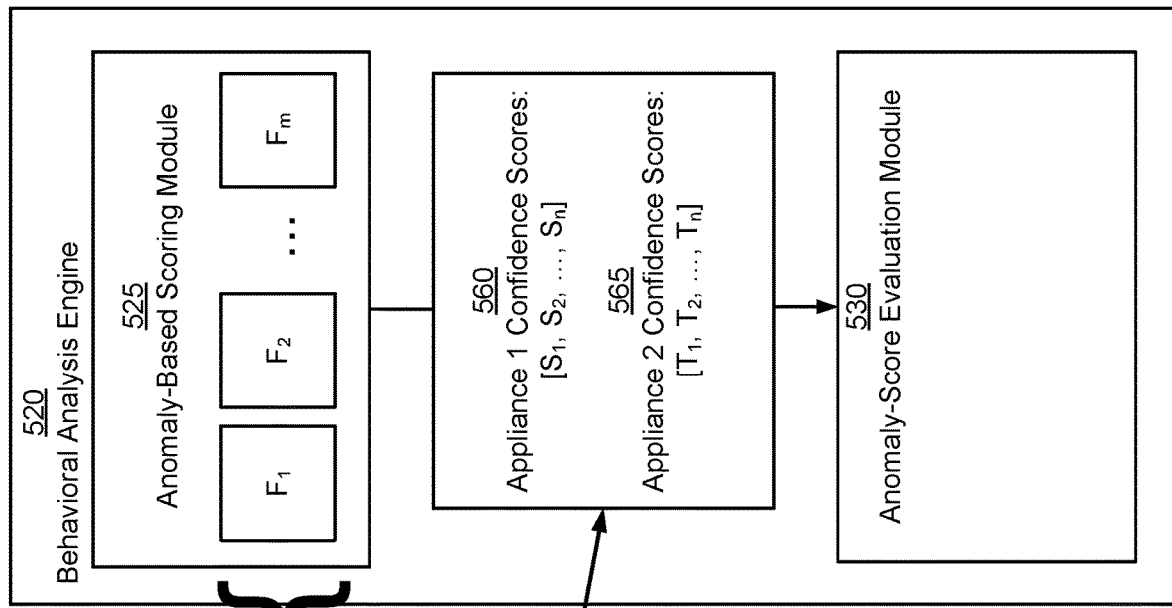
FIG. 5B is a high level block diagram illustrating confidence scores being generated, in accordance with an example embodiment.
Figure 5B:
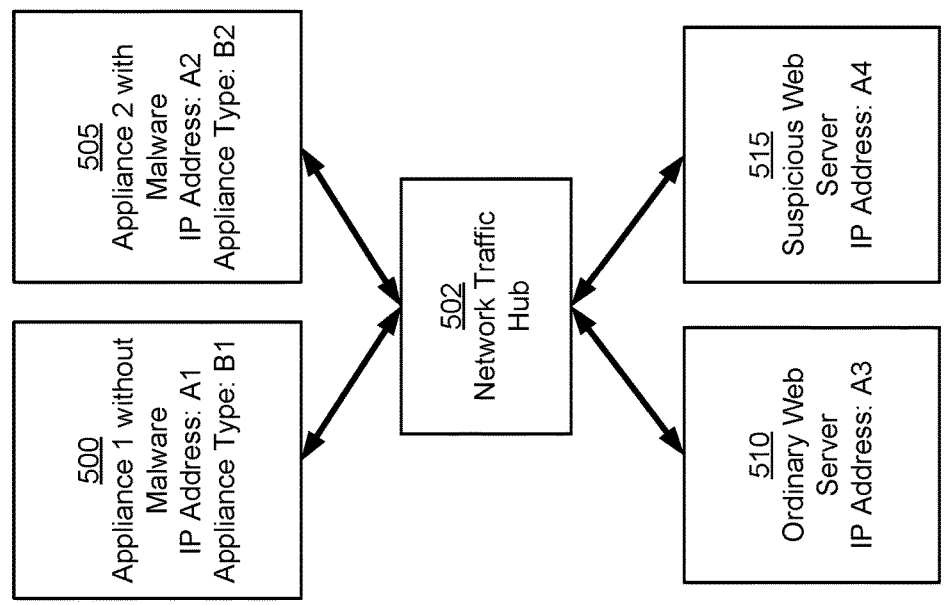
Figure 5C:
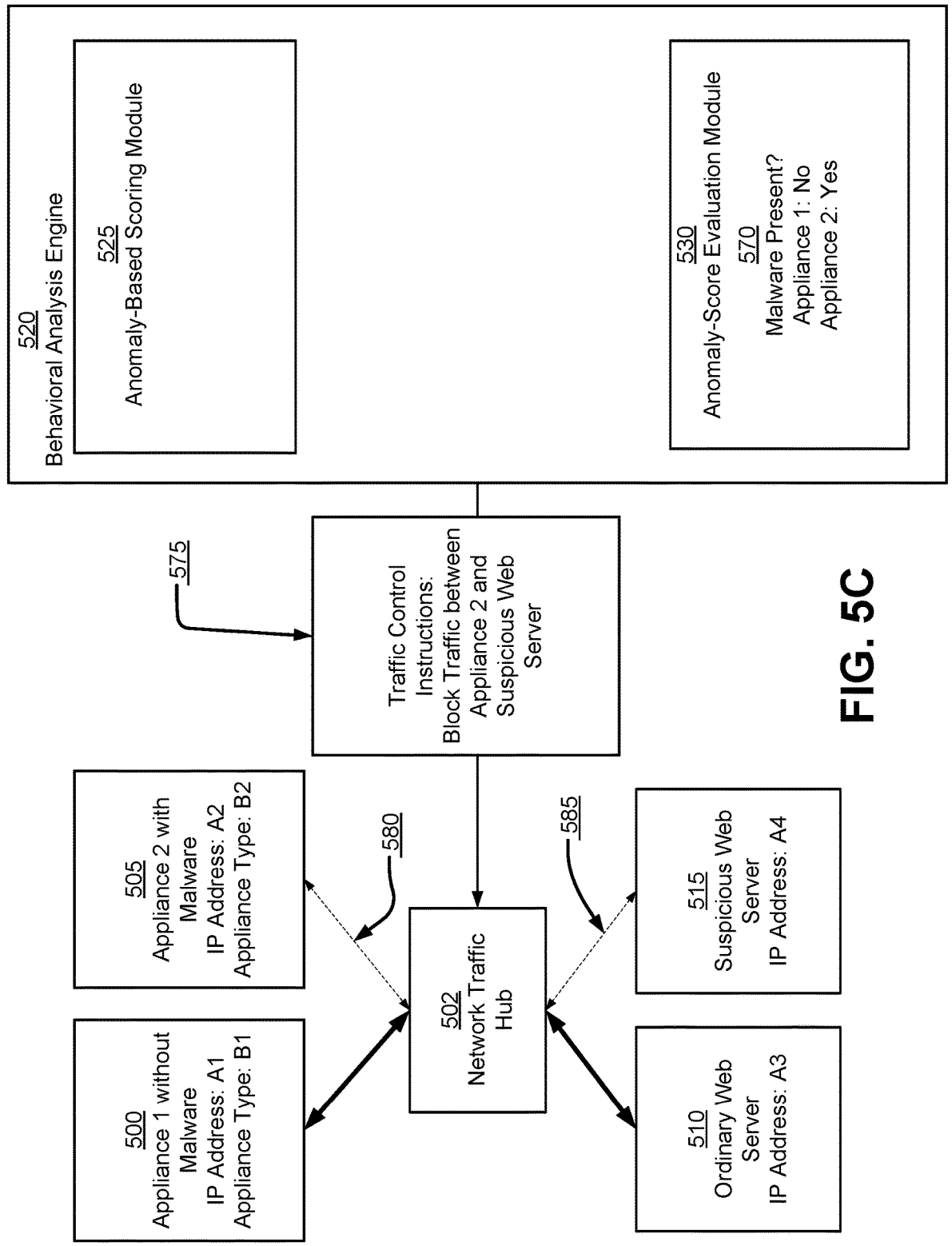
FIG. 5C is a high level block diagram illustrating traffic control instructions being sent to a network traffic hub, in accordance with an example embodiment.

FIGS. 5A, 5B, and 5C are high level block diagrams that together illustrate an example to determine the existence of malware on a smart appliance and block traffic to and from an appliance. FIG. 5A illustrates example network traffic data and identification data being sent from a network traffic hub 105 to a behavioral analysis engine 110. FIG. 5B illustrates an example of confidence levels being generated. FIG. 5C illustrates an example of traffic control instructions being sent to a network traffic hub. It is understood that other embodiments may exist that do not perform exactly as illustrated in these figures or may contain additional, fewer or different components than those illustrated.

Referring to FIG. 5A, appliance 1 500 is a smart appliance that does not contain any malicious code, or "malware," and therefore does not exhibit any malicious behavior. Appliance 2 505 is a smart appliance that contains malware and is exhibiting malicious behavior. Ordinary Web Server 510 is a web server that does not serve any malicious purpose and, therefore, does not exhibit malicious behavior. Suspicious Web Server 515 is a web server that serves a malicious purpose and, therefore, exhibits malicious behavior. Appliance 1 500, appliance 2 505, ordinary web server 510, and suspicious web server 515 communicate 507 through the network traffic hub 502. Appliance 1 500 communicates frequently with ordinary web server 510 and infrequently with suspicious web server 515. Appliance 2 communicates frequently with both ordinary web server 510 and suspicious web server 515. Appliance 1 500 is at internet address A1, appliance 2 505 is at internet address A2, ordinary web server 510 is at internet address A3, and suspicious web server is at internet address A4.

The network traffic hub 502 receives all communication 507 sent between the appliances (500, 505) and the servers (510, 515). The network traffic hub 502 generates network traffic data 540 based on the communication 507. The network traffic data 540 describes how much traffic was sent through the network. For example, the network traffic data 540 specifies that X1 amount of data was sent from address A1 to A3. The network traffic data 540 is sent 535 to the behavior analysis engine 520.

The network traffic hub 502 also generates identification data 545. The identification data 545 describes which appliance is at which internet address. For example, it specifies that appliance 1 500 is at internet address A1. In addition, the identification data 545 identifies a type of each smart appliance. For example, it specifies that appliance 2 505 has type B2. The identification data 545 is sent by the network traffic hub 502 to the behavior analysis engine 520.

Referring now to FIG. 5B, the behavioral analysis engine 520 receives the network traffic data 540 and the identification data 545. The anomaly detection module 525 receives the network traffic data 540 and the identification data 545 and extracts important features 550 from the network traffic data 540 and the identification data 545. For example, F1 might be the total bandwidth of the communications 507 and F2 might be the average packet size of in the communications.

The anomaly detection module 525 uses the extracted important features 550 to generate confidence levels for appliance 1 and appliance 2, represented as confidence scores (560, 565 respectively). The confidence scores (560, 565) represent the likelihood that an anomaly is present in the network traffic data 540 and the identification data 545, and the likelihood that the anomaly was caused by malicious behavior. The confidence scores for appliance 1 560 are confidence scores for anomalies relating to appliance 1 500 and the confidence scores for appliance 2 565 are confidence scores for anomalies relating to appliance 2 505. After computing the confidence scores (560, 565), the anomaly detection module 525 sends 555 the confidence scores (560, 565) to the anomaly control module 530.

Referring now to FIG. 5C, after receiving the confidence scores (560, 565), the anomaly control module 530 makes a determination 570 about whether it thinks that malware is present on appliance 1 500 and appliance 2 505. The anomaly control module 530 makes the determination 570 based on the confidence scores (560, 565). Based on the confidence scores (560, 565), the anomaly control module 530 determines that appliance 1 500 does not have malware and that appliance 2 505 does have malware. The anomaly control module 530 also determines that the malware on appliance 2 505 is communicating with suspicious web server 515, and that the traffic between appliance 2 505 and ordinary web server 510 is not malicious. The anomaly control module sends traffic control instructions 575 to the network traffic hub 502. The traffic control instructions 575 instruct the network traffic control hub 502 to block traffic between appliance 2 505 and suspicious web server 515. Upon receiving the traffic control instructions 575, the network traffic hub 502 then blocks traffic 580 coming from appliance 2 505 going to the suspicious web server 515. The network traffic hub 502 also blocks traffic 585 coming from the suspicious web server 515 going to appliance 2 505.

Identifying Smart Appliances in a Network

Figure 6:
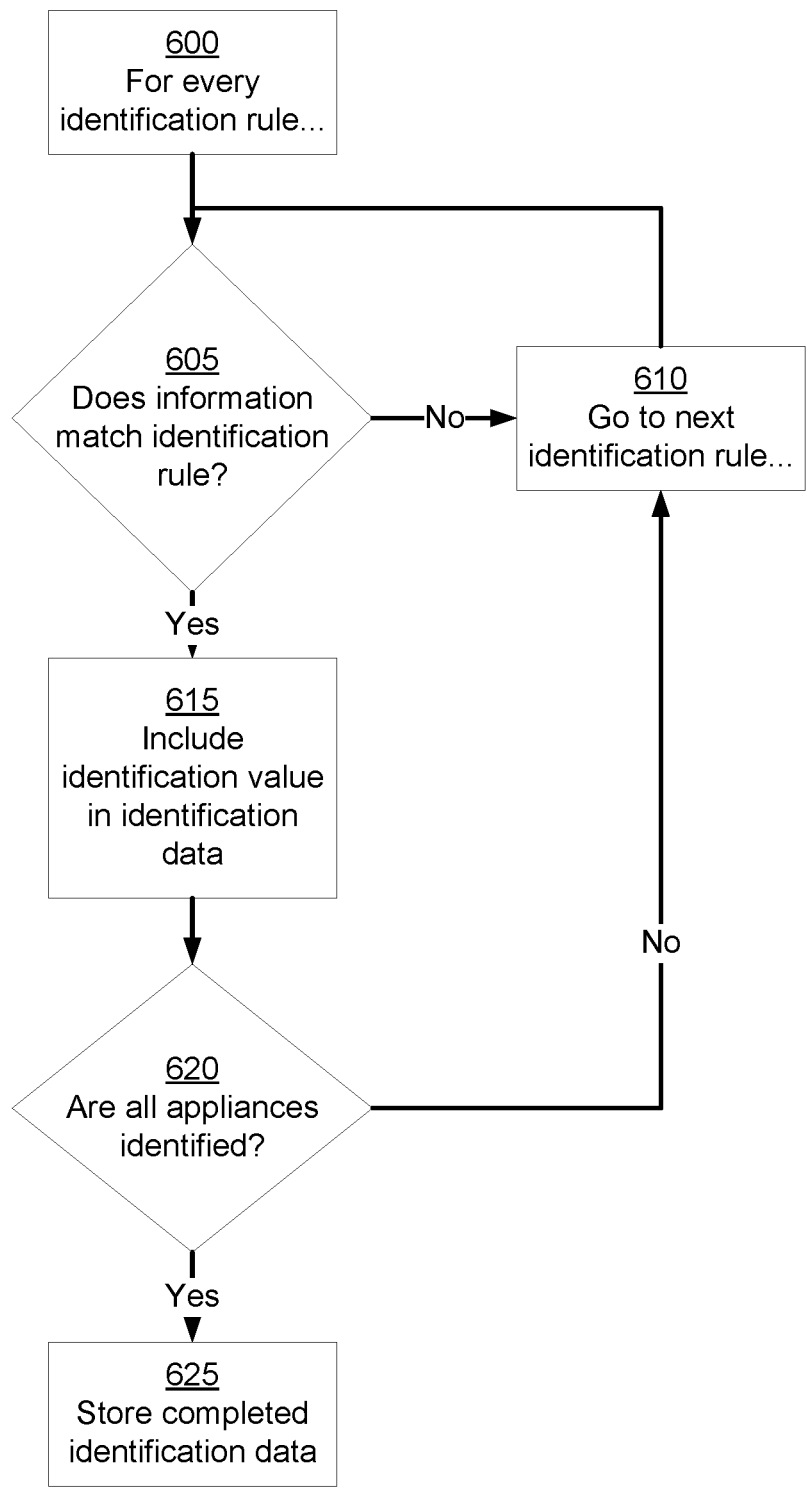
FIG. 6 is a flowchart illustrating a method for generating identification data using identification rules, in accordance with an example embodiment.

FIG. 6 is a flowchart illustrating an example method for generating identification data using identification rules. The steps for the method presented in FIG. 6 could be performed in a different order, and the method might include additional, fewer, or different steps. In the embodiment illustrated, the method in FIG. 6 is performed by the network traffic hub 105. The network traffic hub 105 may be a device in a local network 120b or may be on an online server cluster 115 in a cloud network 120a.

The network traffic hub 105 receives network traffic from the local network 120b. The network traffic hub 105 can passively extract identification information from the network traffic by extracting fields from messages traveling through the local network 120b. The network traffic hub 105 can also actively extract identification information from the local network 120b by sending messages following broadcast protocols to the smart appliances 100 and extracting the identification information from the responses to the initial messages. In some embodiments, the network traffic hub 105 comprises a device in the local network 120b that sends the identification information to an online server cluster 115 in a cloud network 120a.

The network traffic hub 105 stores identification rules. In some embodiments, the rules are stored and applied on a device in the local network 120b. In other embodiments, the rules are stored and applied on an online server cluster 115 in a cloud network 120a. The identification rules specify how identification information is converted to identification data. Sometimes, a rule extracts a field out of a communication and that field is stored in the identification data. For example, smart appliances may include their MAC address in DHCP requests, which can be stored in the identification data to match the appliance to an internet address. Sometimes, a rule uses information from multiple sources to infer matches of smart appliances to internet addresses or the types of the smart appliances. For example, the identification information might include data that would only be requested by a specific type of smart appliance and, therefore, the identification rule can infer the type of the smart appliance. Together, the identification rules allow the network traffic hub 105 to match smart appliances with internet addresses and to identify the types of the smart appliances.

The network traffic hub 105 applies every identification rule 600 to the identification information. Each identification rule is applied by checking if the identification information matches a condition specified by the identification rule. The identification rule specifies one or more identification values to be included in the identification data if the identification information matches the condition specified by the rule. For example, an identification rule might be read, in plain English, as follows: if the identification information contains A, B, and C, then include identification value D in the identification data.

After applying the identification rule, the network traffic hub 105 determines if the conditions in the identification information matches the condition in the identification rule 605. If not, then the network traffic hub 105 proceeds to the next identification rule 610. If so, the network traffic hub 105 includes the identification value specified by the identification rule in the identification data 615. After including the identification value in the identification data 615, the network traffic hub 105 checks if all smart appliances 100 in the local network 120b have been identified 620. If not, the network traffic hub 105 proceeds to the next identification rule 610. If so, the network traffic hub stores the completed identification data 625.

Architecture of Devices

Figure 7:
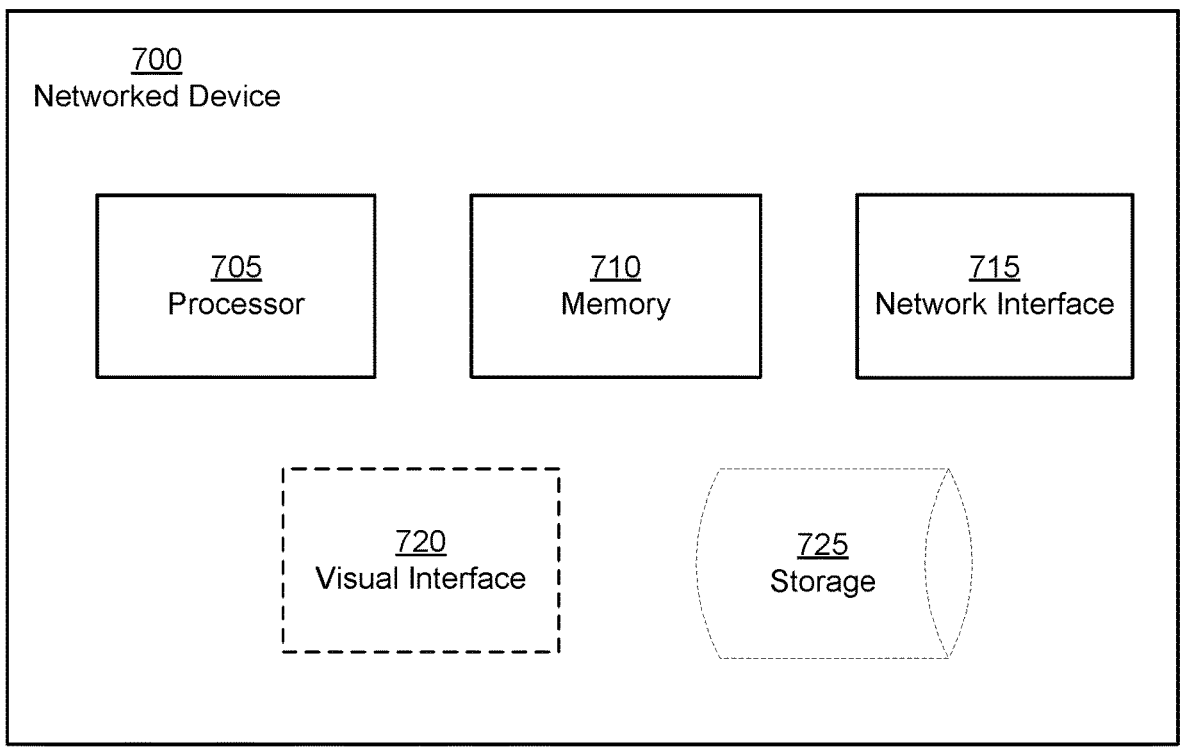
FIG. 7 is a high level block diagram illustrating an example networked device, in accordance with an example embodiment.

FIG. 7 is a high level block diagram illustrating an exemplary networked device. The functionality of the modules in FIG. 7 can be performed by additional, fewer, or different modules and the functionality of the modules can be divvied between modules differently from how it is described below.

A networked device 700 is a device that connects to a network and communicates with other devices via the network. A networked device 700 could be a smart appliance, the network traffic hub 105, or any other device that is connected to either the local network 120b or the cloud network 120a. A networked device 700 has a processor 705 that is used to execute code stored in memory 710. The processor 705 may also send messages to and receive message from the network interface 715 to communicate with other devices. The memory 710 is used by the processor 705 to store data needed by the networked device 700. The memory might be used to hold code that is executed by the processor 705 or could store data that the networked device 700 needs to maintain. The network interface 715 allows the networked device 700 to communicate with other networked devices 700. In some embodiments, a networked device 700 might allow a user to interact with the device 700 via a visual interface 720. In some embodiments, the user interacts with the networked device 700 through the network interface 715. In some embodiments, the networked device 700 might have a storage unit 725 that it uses separately from the memory 710 to store long-term data.

It is noted that a smart appliance and the network hub may include the components shown and described in FIG. 7, but that the individual configurations of processing power, storage, visual interface sophistication, and storage requirements will defer depending on the particular functions as described herein.

ADDITIONAL CONSIDERATIONS

The disclosed configurations provide benefits and advantages that include detecting malicious behavior involving a smart appliance without requiring the smart appliance to have specialized software installed. The network traffic hub monitoring traffic to and from the smart appliance also is configured to automatically detect and add new smart appliances added and begin monitoring network traffic to those appliances. Using this approach removes the need more powerful computing resources in the smart appliances as it removes the need for resource intensive software or custom software typically needed for detection of malicious network data activity. The network traffic hub also is configured to analyze network traffic data from multiple local networks to detect malicious behavior in a smart appliance and inhibit malicious behavior involving a smart appliance without significantly impacting the performance of the smart appliance or network to which the smart appliance is connected.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for network security analysis for smart appliances through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving network traffic data from a network traffic hub within a local network, the network traffic hub configured to aggregate intercepted network traffic;
receiving identification data from the network traffic hub identifying a smart appliance on the local network and identifying a current internet address for the smart appliance on the local network;
computing, for the smart appliance, a score comprising a numeric confidence value representing a probability that the smart appliance is performing a malicious behavior and based on historic network traffic data and identification data associated with a different smart appliance performing malicious behavior;
when it is determined that the numeric confidence value exceeds a first threshold, blocking subsequent network traffic being sent by or to the smart appliance and sending a notification to a user;
when it is determined that the numeric confidence value is less than the first threshold but greater than a second threshold, adding the smart appliance to a security watchlist and alerting an operator associated with the network traffic hub of the smart appliance and/or the computed score.

2. The method of claim 1, further comprising:
receiving, from the network traffic hub, software that is being downloaded by the smart appliance;
determining that the software is malicious; and
transmitting an instruction to the network traffic hub to block network traffic associated with the software.

3. The method of claim 1, wherein the historic network traffic data is received over a threshold period of time.

4. The method of claim 1, wherein the score is additionally computed using threat Intel data.

5. The method of claim 1, wherein the notification contains information about a source address or a destination internet address associated with the blocked network traffic.

6. The method of claim 1, wherein the score is additionally computed based on one or more of: a time interval associated with features of the network traffic data or the identification data, a location for smart appliance behavior that may be falsely determined to be malicious, and a timeframe for a software update.

7. A non-transitory computer-readable storage medium storing executable computer instructions that, when executed by a hardware processor, cause the hardware processor to perform steps comprising:
receiving network traffic data from a network traffic hub within a local network, the network traffic hub configured to aggregate intercepted network traffic;
receiving identification data from the network traffic hub identifying a smart appliance on the local network and identifying a current internet address for the smart appliance on the local network;
computing, for the smart appliance, a score comprising a numeric confidence value representing a probability that the smart appliance is performing a malicious behavior and based on historic network traffic data and identification data associated with a different smart appliance performing malicious behavior;
when it is determined that the numeric confidence value exceeds a first threshold, blocking subsequent network traffic being sent by or to the smart appliance and sending a notification to a user;
when it is determined that the numeric confidence value is less than the first threshold but greater than a second threshold, adding the smart appliance to a security watchlist and alerting an operator associated with the network traffic hub of the smart appliance and/or the computed score.

8. The non-transitory computer-readable storage medium of claim 7, wherein the instructions, when executed, cause the processor to perform further steps comprising:
receiving, from the network traffic hub, software that is being downloaded by the smart appliance;
determining that the software is malicious; and
transmitting an instruction to the network traffic hub to block network traffic associated with the software.

9. The non-transitory computer-readable storage medium of claim 7, wherein the historic network traffic data is received over a threshold period of time.

10. The non-transitory computer-readable storage medium of claim 7, wherein the score is additionally computed using threat Intel data.

11. The non-transitory computer-readable storage medium of claim 7, wherein the notification contains information about a source address or a destination Internet address associated with the blocked network traffic.

12. The non-transitory computer-readable storage medium of claim 7, wherein the score is additionally computed based on one or more of: a time interval associated with features of the network traffic data or the identification data, a location for smart appliance behavior that may be falsely determined to be malicious, and a timeframe for a software update.

13. A system comprising:
a non-transitory computer-readable storage medium storing executable instructions that, when executed, cause the system to perform steps comprising:
receiving network traffic data from a network traffic hub within a local network, the network traffic hub configured to aggregate intercepted network traffic;
receiving identification data from the network traffic hub identifying a smart appliance on the local network and identifying a current internet address for the smart appliance on the local network;
computing, for the smart appliance, a score comprising a numeric confidence value representing a probability that the smart appliance is performing a malicious behavior and based on historic network traffic data and identification data associated with a different smart appliance performing malicious behavior;
when it is determined that the numeric confidence value exceeds a first threshold, blocking subsequent network traffic being sent by or to the smart appliance and sending a notification to a user;
when it is determined that the numeric confidence value is less than the first threshold but greater than a second threshold, adding the smart appliance to a security watchlist and alerting an operator associated with the network traffic hub of the smart appliance and/or the computed score; and
a processor configured to execute the instructions.

14. The system of claim 13, wherein the instructions, when executed, cause the system to perform further steps comprising:
receiving, from the network traffic hub, software that is being downloaded by the smart appliance;
determining that the software is malicious; and
transmitting an instruction to the network traffic hub to block network traffic associated with the software.

15. The system of claim 13, wherein the historic network traffic data is received over a threshold period of time.

16. The system of claim 13, wherein the score is additionally computed using threat Intel data.

17. The system of claim 13, wherein the notification contains information about a source address or a destination internet address associated with the blocked network traffic.

* * * * *